United States Patent
Lee (10) Patent No.: US 9,883,210 B2
(45) Date of Patent: Jan. 30, 2018

(54) DISPLAY DEVICE AND METHOD FOR OPERATING THE SAME

(71) Applicant: LG ELECTRONICS INC., Seoul (KR)

(72) Inventor: Jaekyung Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/102,460

(22) PCT Filed: Mar. 27, 2014

(86) PCT No.: PCT/KR2014/002586
§ 371 (c)(1),
(2) Date: Jun. 7, 2016

(87) PCT Pub. No.: WO2015/102158
PCT Pub. Date: Jul. 9, 2015

(65) Prior Publication Data
US 2016/0316232 A1    Oct. 27, 2016

(30) Foreign Application Priority Data
Jan. 2, 2014   (KR) ........................ 10-2014-0000369

(51) Int. Cl.
*H04N 7/18* (2006.01)
*H04N 21/233* (2011.01)
*H04N 21/41* (2011.01)
*H04N 21/4223* (2011.01)
*H04N 21/442* (2011.01)
*H04N 21/454* (2011.01)
(Continued)

(52) U.S. Cl.
CPC .......... *H04N 21/233* (2013.01); *G06F 3/165* (2013.01); *H04N 21/4126* (2013.01); *H04N 21/4223* (2013.01); *H04N 21/43637* (2013.01); *H04N 21/44218* (2013.01); *H04N 21/454* (2013.01); *H04N 21/47217* (2013.01); *H04N 21/482* (2013.01); *H04N 21/64322* (2013.01)

(58) Field of Classification Search
CPC .................................................... H04N 13/08
USPC .............................................. 725/80
See application file for complete search history.

(56) References Cited

U.S. PATENT DOCUMENTS

| 2006/0061684 A1* | 3/2006 | Easley | H04H 20/47 348/485 |
| 2011/0206353 A1* | 8/2011 | Yeo | G06F 1/3231 386/291 |
| 2013/0183021 A1* | 7/2013 | Osman | H04N 9/87 386/239 |

FOREIGN PATENT DOCUMENTS

JP       5302876 B2    10/2013
KR    10-2013-0107093 A   10/2013
(Continued)

OTHER PUBLICATIONS

International Search Report dated Oct. 21, 2014 issued in Application No. PCT/KR2014/002586 (with English Translation).

*Primary Examiner* — Michael Hong
(74) *Attorney, Agent, or Firm* — KED & Associates, LLP (57) ABSTRACT

A method for operating a display device according to an embodiment of the present invention comprises the steps of playing back a broadcast program; obtaining a user's watching status while the broadcast program is played back; and providing information of the display device if the obtained (Continued)

user's watching status is obtained as a non-visual watching status in which the user does not watch a display unit of the display device.

10 Claims, 7 Drawing Sheets

(51) Int. Cl.
*G06F 3/16* (2006.01)
*H04N 21/472* (2011.01)
*H04N 21/482* (2011.01)
*H04N 21/643* (2011.01)
*H04N 21/4363* (2011.01)

(56) References Cited

FOREIGN PATENT DOCUMENTS

| | | |
|---|---|---|
| KR | 10-2013-0107555 A | 10/2013 |
| KR | 10-2013-0127777 A | 11/2013 |
| WO | WO 2012/162060 A2 | 11/2012 |

* cited by examiner

| value | description |
|---|---|
| 0x00 | undefined |
| 0x01 | clean effects |
| 0x02 | hearing impaired |
| 0x03 | visual impaired commentary |
| 0x04-0xFF | reserved |

FIG. 11

| | | |
|---|---|---|
| 0x02 | 0x04 | audio, multi-lingual, multi-channel |
| 0x02 | 0x05 | audio, surround sound |
| 0x02 | 0x06 to 0x3F | reserved for future usereserved for future use |
| 0x02 | 0x40 | audio description for the visually impaired |
| 0x02 | 0x41 | audio for the hard of hearing |
| 0x02 | 0x42 | receiver-mixed supplementary audio as per annex G |
| 0x02 | 0x43 to 0xAF | reserved for future use |
| 0x02 | 0xB0 to 0xFE | user-defined |

FIG. 12

DISPLAY DEVICE AND METHOD FOR OPERATING THE SAME

CROSS-REFERENCE TO RELATED PATENT APPLICATIONS

This application is a U.S. National Stage Application under 35 U.S.C. §371 of PCT Application No. PCT/KR2014/002586, filed Mar. 27, 2014, which claims priority to Korean Patent Application No. 10-2014-0000369, filed Jan. 2, 2014, whose entire disclosures are hereby incorporated by reference.

TECHNICAL FIELD

The present invention relates to a display device and a method for operating the display device. More particularly, the present invention relates to a display device and a method for operating the display device, capable of providing information based on a user's watching status.

BACKGROUND ART

Recently, a digital TV service using a wired or wireless communication network is becoming common. The digital TV service may provide a variety of services that could not be provided in the existing analog broadcast service.

For example, in case of IPTV (Internet Protocol Television) service which is a kind of a digital TV service, it provides an interactivity that enables a user to actively select kinds and watching time of watching program. The IPTV service may provide a variety of additional services based on such an interactivity, including Internet search, home shopping, online game, etc.

Conventionally, however, if a user is in a status that he or she is not able to watch TV visually, there is a limitation to provide program information and subtitle information of a broadcast program that is currently played back, and event information generating in a display device.

Technical Problem

The objective of the present invention is to provide a display device and a method for operating the display device, capable of providing a user with a variety of information even if the user is in a status that he or she is not able to watch the display device visually.

Technical Solution

In accordance with an embodiment of the present invention, there is provided a method for operating a display device, comprising playing back a broadcast program; obtaining a user's watching status while the broadcast program is played back; and providing information of the display device if the obtained user's watching status is obtained as a non-visual watching status in which the user does not watch a display unit of the display device.

In accordance with another embodiment of the present invention, there is provided a display device, comprising a tuner configured to receive a broadcast signal; a display unit configured to display an image of the broadcast program included in the broadcast signal; an audio output unit configured to output a sound; and a control unit configured to provide information of the display device if a user's watching status is obtained as a non-visual watching status that a user does not watch the display unit of the display device.

Advantageous Effects

According to various embodiments of the present invention, a user may be provided with a variety of information even if the user is not able to watch a display device visually.

DESCRIPTION OF REFERENCE NUMERALS

Best Mode

Hereinafter, embodiments of the present invention are described in detail with reference to accompanying drawings. Suffixes in the components, "modules" and "units", used in the description below are given or mixed only considering the easiness of preparing the description and do not have separate meanings or roles in themselves.

Figure 1:
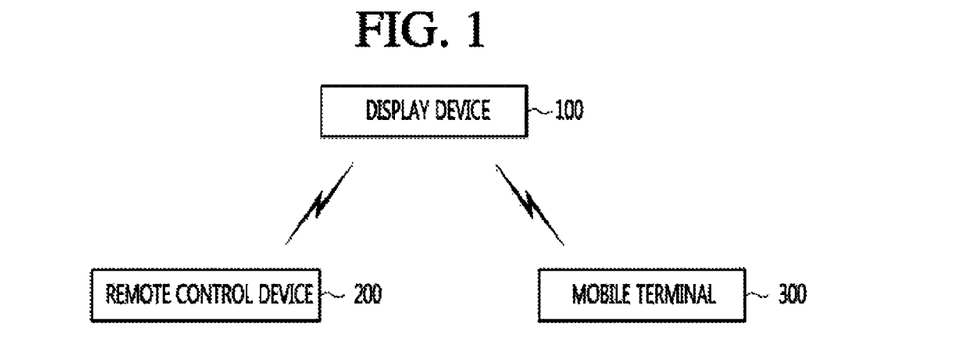
FIG. 1 is a view illustrating a display system according to an embodiment of the present invention.

FIG. 1 is a view illustrating a display system according to an embodiment of the present invention.

The display system according to an embodiment of the present invention comprises a display device 100, a remote control device 200 and a mobile terminal 300.

The display device 100 is an intelligent device that has a computer support function additionally to a broadcast receiving function, for example. So, it additionally have an Internet function and the like while faithfully performing a broadcast receiving function, which may have more convenient interfaces such as a handwriting input device, a touch screen or a space remote controller. Also, if connected to an Internet and computer with the support of a wired or wireless remote Internet function, the display unit 100 may perform such functions as E-mail, Web browsing, banking or game. A standardized general-purpose OS may be used for such a variety of functions.

Accordingly, since the display device 100 described in the present invention may freely add and remove a variety of applications on a general-purpose OS canal, for example, a variety of user friendly functions may be performed. In more detail, the display device 100 may be a network TV, a HBBTV, a smart TV, an LED TV and an OLDED TV, for example, which may be applied to a smart phone according to need.

The remote control device 200 may transmit a control command to control an operation of the display device 100, thereby controlling the operation of the display device 100. The explanation for that is described in detail below.

The mobile terminal 300 may transmit and receive information to and from the display device 100 through an NFC (Near Field Communication) interface.

Figure 2:
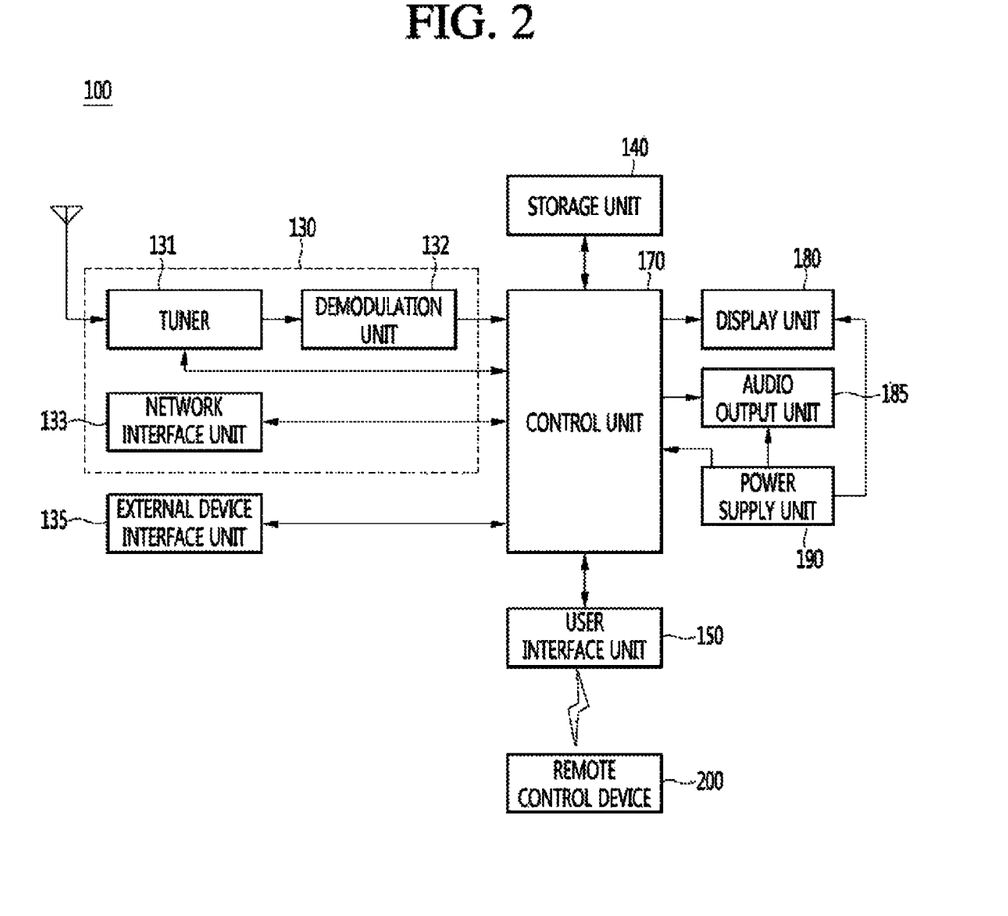
FIG. 2 is a block diagram illustrating a configuration of a display device according to an embodiment of the present invention.

FIG. 2 is a block diagram illustrating a configuration of a display device according to an embodiment of the present invention.

Referring to FIG. 2, the display device 100 may comprise a broadcast receiving unit 130, an external device interface unit 135, a storage unit 140, a user input interface unit 150, a control unit 170, a display unit 180, an audio output unit 185 and a power supply unit 190. Meanwhile, the broadcast receiving unit 130 may comprise a tuner 131, a demodulation unit 132 and a network interface unit 133.

The external device interface unit 135 may receive an application or an application list existing in an adjacent external device, and transfer it to the control unit 170 or the storage unit 140.

The network interface unit 133 may provide an interface to connect the display device 100 to a wired/wireless network including an Internet network. The network interface unit 133 may transmit or receive data to or from other users or other electronic equipment through a connected network or another network linked to the connected network.

Also, some content data stored in the display device 100 may be transmitted to a user or electronic equipment selected among other users or other electronic equipment that are registered in the display device 100 in advance.

The network interface unit 133 may be connected to a predetermined web page through a connected network or another network linked to the connected network. That is, by connecting to the predetermined web page through a network, it may be possible to transmit or receive data to or from a relevant server.

Further, the network interface unit 133 may receive contents or data provided by a content provider or a network operator. That is, the network interface unit 133 may receive contents such as movies, advertisements, games, VODs, broadcast signals and information related therewith that are provided from the content provider or network operator through a network.

Also, the network interface unit 133 may receive update information and update files of a firmware provided by the network operator, and transmit data to the Internet or content provider or the network operator.

The network interface unit 133 may select and receive a desired application among applications opened to the public through a network.

The storage unit 140 may store programs that are used to process and control each signal in the control unit 170, and signal processed images, sounds or data signals.

Also, the storage 140 may perform a function to temporarily store images, sounds or data signals inputted from the external device interface unit 135 or the network interface unit 133, and store desired image information through a channel memory function.

The storage unit 140 may store an application or an application list inputted from the external device interface unit 135 or the network interface unit 133.

The display device 100 may play back content files (moving image file, still image file, music file, document file, application file, etc.) stored in the storage unit 140 to provide them to a user.

The user input interface unit 150 may transfer a signal inputted by the user to the control unit 170, or transfer a signal from the control unit 170 to the user. For example, the user input interface unit 150 may receive control signals such as power on/off, channel selection and screen setting from the remote control device 200 to process, according to a variety of communication schemes such as Bluetooth scheme, WB (Ultra Wideband) scheme, ZigBee scheme, RF (Radio Frequency) communication scheme or IR communication scheme. Further, the user input interface unit 150 may serve to transmit a control signal from the control unit 170 to the remote control device 200.

Also, the user input interface unit 150 may transfer control signals inputted from a local key (not shown) such as power key, channel key, volume key, setting key, etc. to the control unit 170.

An image signal processed in the control unit 170 is inputted to the display unit 180 so that it may be displayed as an image corresponding to the image signal. Also, the image signal processed in the control unit 170 may be inputted to an external output device through the external device interface unit 135.

The sound signal processed in the control unit 170 may be audibly outputted through the audio output unit 185. Also, the sound signal processed in the control unit 170 may be inputted to an external output device through the external device interface unit 135.

Besides, the control unit 170 may control general operations of the display device 100.

Also, the control unit 170 may control the display device 100 using user commands or internal programs inputted through the user input interface unit 150, and may be connected to a network so that a user's desired application or an application list is to be downloaded into the display device 100.

The control unit 170 enables channel information and the like selected by the user together with a processed image or sound signal to be outputted through the display unit 180 or the audio output unit 185.

Also, the control unit 170 enables image signals or sound signals from an external device such as a camera or a camcorder, which are inputted through the external device interface unit 135, to be outputted through the display unit 180 or the audio output unit 184, according to an external device image play command received through the user input interface unit 150.

Meanwhile, the control unit 170 may control the display unit 180 to display an image. For example, the control unit 170 may control the display unit 180 to display a broadcast image inputted through a tuner 131, an external input image inputted through the external device interface unit 135, an image inputted through the network interface unit, or an image stored in the storage unit 140, on the display unit 180. In this case, the image displayed on the display unit 180 may be a still image or a moving image, and a 2D image or a 3D image.

Also, the control unit 170 may control to play back contents stored in the display device 100, received broadcast contents, or external input contents inputted from the outside, and the contents may be a variety of forms such as a broadcast image, an external input image, an audio file, a still image, a connected web screen, and a document file.

The display unit 180 may convert into R, G and B signals an image signal, a data signal and an OSD signal that are processed in the control unit 170, or an image signal and a data signal received in the external device interface unit 135 to generate a driving signal.

Meanwhile, since the display device 100 illustrated in FIG. 2 is merely an embodiment of the present invention, some of the illustrated elements may be integrated, added or omitted depending on the specification of the display device 100 that is actually embodied.

That is, according to need, two or more elements may be integrated in one element or one element may be subdivided into two or more elements. Also, functions performed in each block are used to describe embodiments of the present invention, and their detailed operations or devices do not limit the right scope of the present invention.

According to another embodiment of the present invention, the display device 100 may receive images through the network interface unit 133 or the external device interface unit 135 to play back without comprising the tuner 131 and a demodulation unit 132, differently from FIG. 2.

For example, the display device 100 may be separately embodied in two devices, that is, an image processing device such as a set top box to receive a broadcast signal or contents depending on a variety of network services and a content play device to play back contents inputted from the image processing device.

In this case, a method for operating a display device to be described below according to embodiments of the present invention may be performed by any one of the image processing device such as the separated set top box and the content play device comprising the display unit 180 and the audio output unit 185, as well as the display device 100 described with reference to FIG. 2.

Next, a remote control device according to an embodiment of the present invention will be described with reference to FIGS. 3 and 4.

Figure 3:
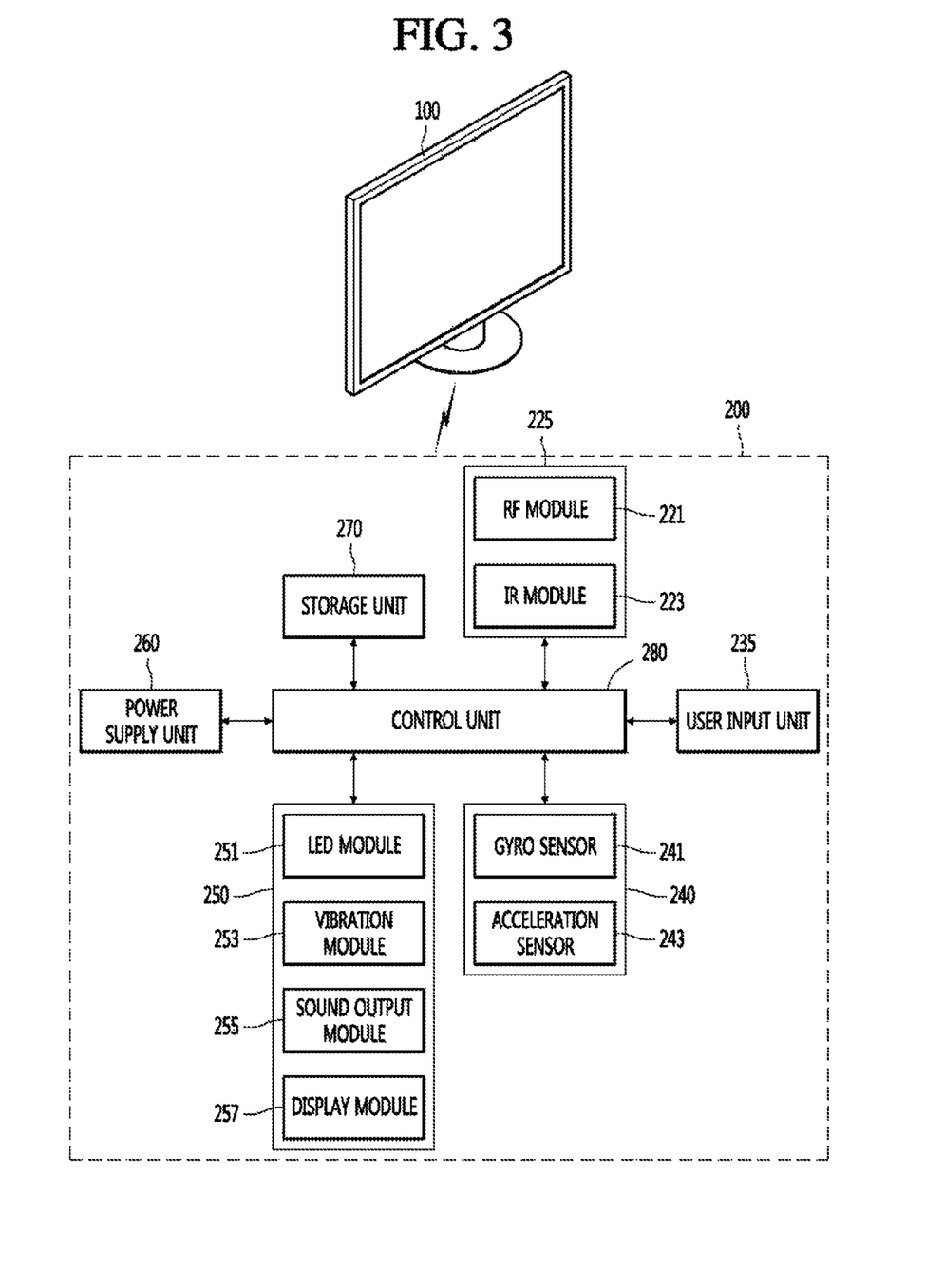
FIG. 3 is a block diagram of a remote control device according to an embodiment of the present invention.
Figure 4:
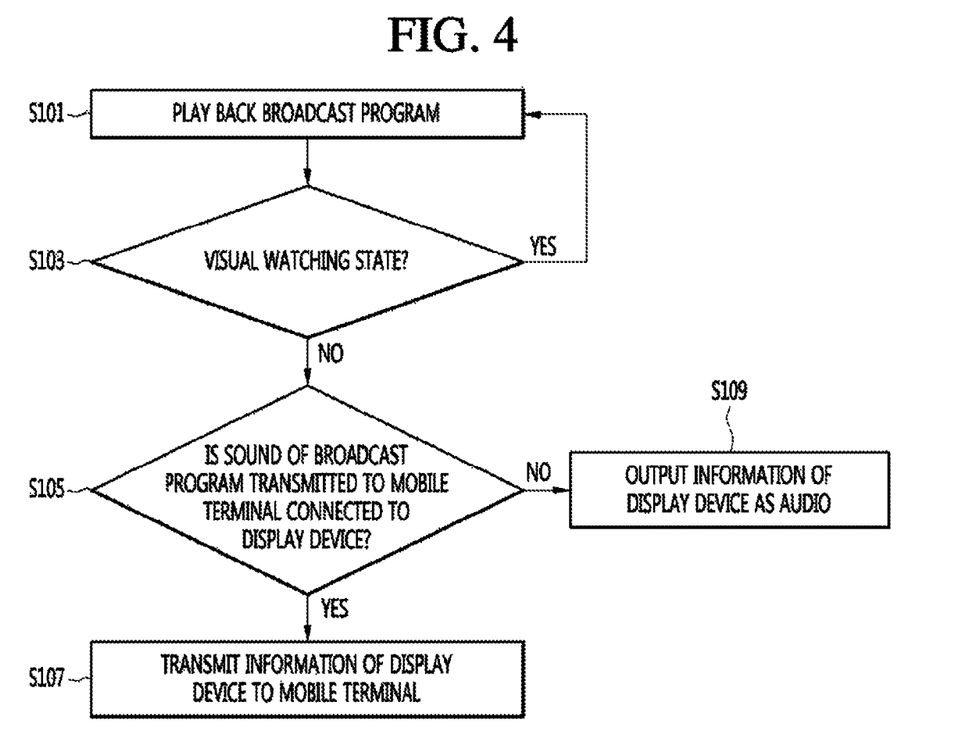
FIG. 4 is a flowchart illustrating a method for operating a display device according to an embodiment of the present invention.

FIG. 3 is a block diagram of a remote control device according to an embodiment of the present invention, and FIG. 4 is a flowchart illustrating a method for operating a display device according to an embodiment of the present invention.

At first, referring to FIG. 3, the remote control device 200 may comprise a wireless communication unit 225, a user input unit 235, a sensor unit 240, an output unit 250, a power supply unit 260, a storage unit 270 and a control unit 280.

Referring to FIG. 3, the wireless communication unit 225 transmits and receives signals to and from arbitrary any one of the display devices according to the embodiments of the present invention described above.

The remote control device 200 may comprise an RF module 221 capable of transmitting and receiving signals to and from the display device 100 according to an RF communication standard, and an IR module 223 capable of transmitting and receiving signals to and from the display device 100 according to an IR communication standard.

Also, the remote control device 200 transmits signals including information on a motion of the remote control device 200 to the display device 100 through the RF module 221.

Meanwhile, the remote control device 200 may receive the signal transmitted from the display device 100 through the RF module 221, and transmit commands on power on/off, channel change and volume change to the display device 100 through the IR module 223 according to need.

The user input unit 235 may be configured of a key pad, a button, a touch pad, or a touch screen. The user may input commands related to the display device 100 to the remote control device 200 by operating the user input unit 235. If the user input unit 235 comprises a hard key button, the user may input commands related to the display device 100 to the remote control device 200 through a push operation of the hard key button.

If the user input unit 235 comprises a touch screen, the user may input commands related to the display device 100 to the remote control device 200 by touching a soft key of the touch screen. Also, the user input unit 235 may comprise various kinds of input means such as a scroll key or a jog key that can be operated by user, and the present embodiment does not limit the right scope of the present invention.

The sensor unit 240 may comprise a gyro sensor 241 or an acceleration sensor 243, and the gyro sensor 241 may sense information on a motion of the remote control device 200.

For example, the gyro sensor 241 may sense information on an operation of the remote control device 200 based on x, y and z axes, and the acceleration sensor 243 may sense information on a moving speed of the remote control device 200 and the like. Meanwhile, the remote control device 200 may further comprise a distance measuring sensor, so that it may sense the distance between the display device 100 and the display unit 180.

The output unit 250 may output image or sound signals corresponding to an operation of the user input unit 235 or the signals transmitted from the display device 100. The user may recognize whether the user input unit 235 is operated or the display device 100 is controlled, through the output unit 250.

For example, the output unit 250 may comprise an LED module 251 to be turned on, a vibration module 253 to generate a vibration, a sound output module 255 to output a sound and a display module 257 to output an image, if the user input unit 235 is operated or the output unit transmits and receives signals to or from the display device 100 through the wireless communication unit 225.

Also, the power supply unit 260 may supply the remote control device 200 with power, and stop supplying power if the remote control device 200 does not move for a predetermined time, reducing power waste. The power supply unit 260 may begin supplying power again if prescribed keys included in the remote control device 200 are operated.

The storage unit 270 may store various kinds of programs and application data that are needed to control or operate the remote control device 200. If the remote control device 200 transmits and receives signals to and from the display device 100 by wireless through the RF module 221, the remote control device 200 and the display device 100 may transmit and receive signals each other through a predetermined frequency band.

The control unit 280 of the remote control device 200 may store in the storage unit 270 information on the frequency band on which signals are transmitted and received to and from the display device 100 paired to the remote control device 200 and the like by wireless, and refer to the information.

The control unit 280 controls various matters related to the control of the remote control device 200. The control unit 280 may transmit a signal corresponding to an operation of the prescribed keys of the user input unit 235 or a signal corresponding to a motion of remote control device 200 sensed in the sensor unit 240 to the display device 100 through the wireless communication unit 225.

Next, a method for operating the display device 100 according to an embodiment of the present invention will be described with reference to FIG. 4.

FIG. 4 is a flowchart illustrating a method for operating a display device according to an embodiment of the present invention.

The control unit 170 of the display device 100 plays back a broadcast program (S101). In an embodiment, the control unit 170 may play back an image of the broadcast program received through a tuner 131. The control unit 170 may output an image of the broadcast program and a sound of the relevant broadcast program so as to play back the broadcast program, and the user may watch the relevant broadcast program through the image and the sound of the broadcast program outputted.

The control unit 170 identifies whether the user is in a visual watching status in which the user is visually watching the broadcast program through the display unit 180 of the display device 100 (S103).

In an embodiment, a user's watching status may include a visual watching status, a non-visual watching status and an audiovisual watching status.

The visual watching status may mean a status in which the user is visually watching the broadcast program through the display unit 180. In case that the user is watching the broadcast program through the sound of the broadcast program only without watching the broadcast program through the display unit 180, it may be obtained that the user is in a non-visual watching status.

The non-visual watching status may mean that the user is not watch the broadcast program through the display unit 180 but is listening to the sound of the broadcast program.

The audiovisual watching status may include the visual watching status and the non-visual watching status, which may mean a status that the user is listening to the sound of the broadcast program while the user is watching the image of the broadcast program.

The non-visual watching status means that the user is doing other actions without watching the display unit 180 that is playing back the broadcast program, which may include status that the user closes his or her eyes, is looking at places other than the display unit 180, or moves other places where there is not the display device 100.

The control unit 170 may identify whether the user is in the visual watching status or the non-visual watching status, using at least one of a face recognition technology and an eye tracking technology.

The face recognition technology may include any one of a knowledge-based method, a feature-based method, a template-matching method and an appearance-based method. Also, the control unit 170 may extract a face area of a user using any one of the above methods and identify whether the user is in the visual watching status through an extracted face area of the user.

The knowledge-based method is a method of detecting a face area based on relationship of fixed distances and positions of eyes, nose and mouth of the face.

The feature-based method is a method of detecting a face area using information on size, shape and interrelation of facial elements, information on color and texture of the face, or information on the combination of such elements.

The template-matching method is a method of producing a standard template for all faces and then comparing it with an input image to detect a face area.

The appearance-based method is a method of detecting a face area using a model learned by a learning image set. The appearance-based method may include a skin color detecting method. The skin color detecting method is a method of simply extracting candidate areas for a face and hands from a user's image, where it may be possible to detect the candidate area easily and quickly although the candidate area may not be correct due to the large effect caused by a lighting and a camera. In detail, the skin color method is a method of obtaining an RGB image of the user, converting it into a YUV image, detecting a skin color using U and V components, and extracting a face area and a hands area of the user through the detected skin color.

The eye tracking means a method of tracking user's eyes for a predetermined time, where a motion of user's pupils is observed and an operation corresponding to the motion is performed.

The display device 100 may further comprise a camera for an eye tracking.

Also, the control unit 170 may identify a motion of the user with respect to a mobile terminal 300 to identify whether the user is in the visual watching status. For example, in case that the user moves to a place other than where the display device 100 is located so that the user is not in the visual watching status, the control unit 170 may receive from the mobile terminal 300 watching status information indicating that the user is not in the visual watching status.

For this, the control unit 170 may comprise a wireless communication unit (not illustrated) to perform a near-field communication NFC with the mobile terminal 300 of the user, and the mobile terminal 300 may also transmit and receive information to and from the wireless communication unit of the display device 100 through the near-field communication.

Also, the mobile terminal 300 may comprise one or more sensors in order to identify a user's watching status. For example, the sensor may comprise at least one of a geomagnetic field sensor, an acceleration sensor, and a hall sensor.

The geomagnetic field sensor may sense the intensity of magnetic field with three (3) axes to identify a moving status of the user. The geomagnetic field sensor may sense the moving status of the mobile terminal 300 to transmit the sensed moving status of the mobile terminal 300 to the display device 100. In case that the display device 100 recognizes that the mobile terminal 300 is away from the display device 100 by a predetermined distance using the received moving status of the mobile terminal 300, the display device 100 may determine that the user is in the non-visual watching status.

The acceleration sensor may sense a moving status of the mobile terminal 300 with three (3) axes and the hall sensor may sense opening and closing status of a cover of the mobile terminal 300 utilizing a principle that the voltage changes depending on the intensity of magnetic field.

The acceleration sensor may sense the moving status of the mobile terminal 300 to transmit the sensed moving status of the mobile terminal 300 to the display device 100, and the hall sensor may sense opening and closing status of a cover of the mobile terminal 300 to transmit the sensed opening and closing status to the display device 100. In case that the mobile terminal 300 is away from the display device 100 by a predetermined distance or more and the cover of the mobile terminal 300 is opened, the display device 100 may determine that the user is in the non-visual watching status using the received moving status of the mobile terminal 300 and the opening and closing status of the cover.

The mobile terminal 300 may be any one of a smart phone, a smart pad, a head set, and an ear phone, and communicate with the display device 100 through the near-field communication.

The near-field communication may be any one of WiFi scheme, Bluetooth scheme, and Zigbee scheme.

A process to identify a user's watching status is described with reference to FIGS. 5 to 7.

Figure 5:
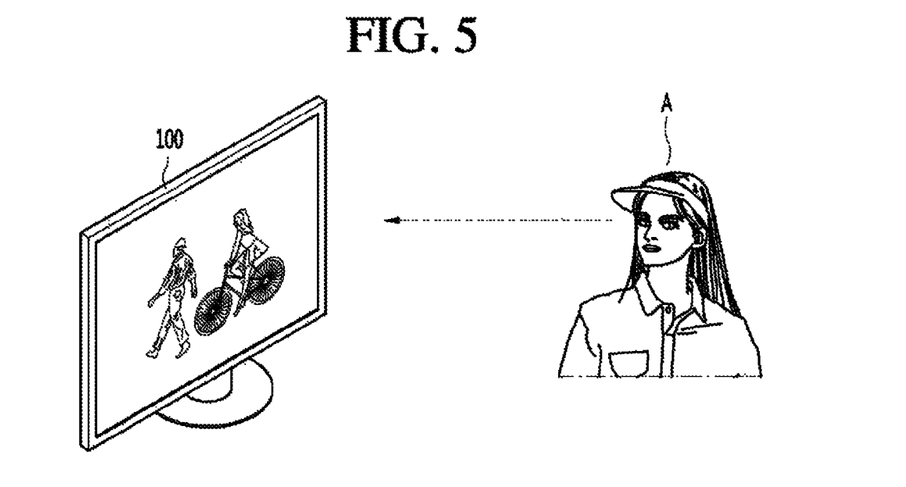
FIGS. 5 to 7 are views illustrating a method of obtaining a user's watching status according to an embodiment of the present invention.
Figure 6:
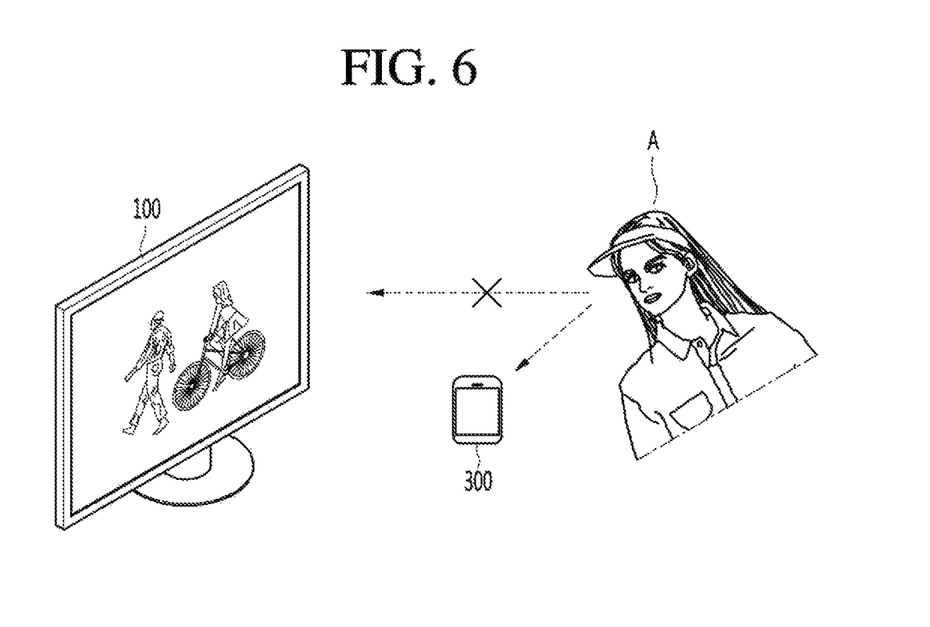
Figure 7:
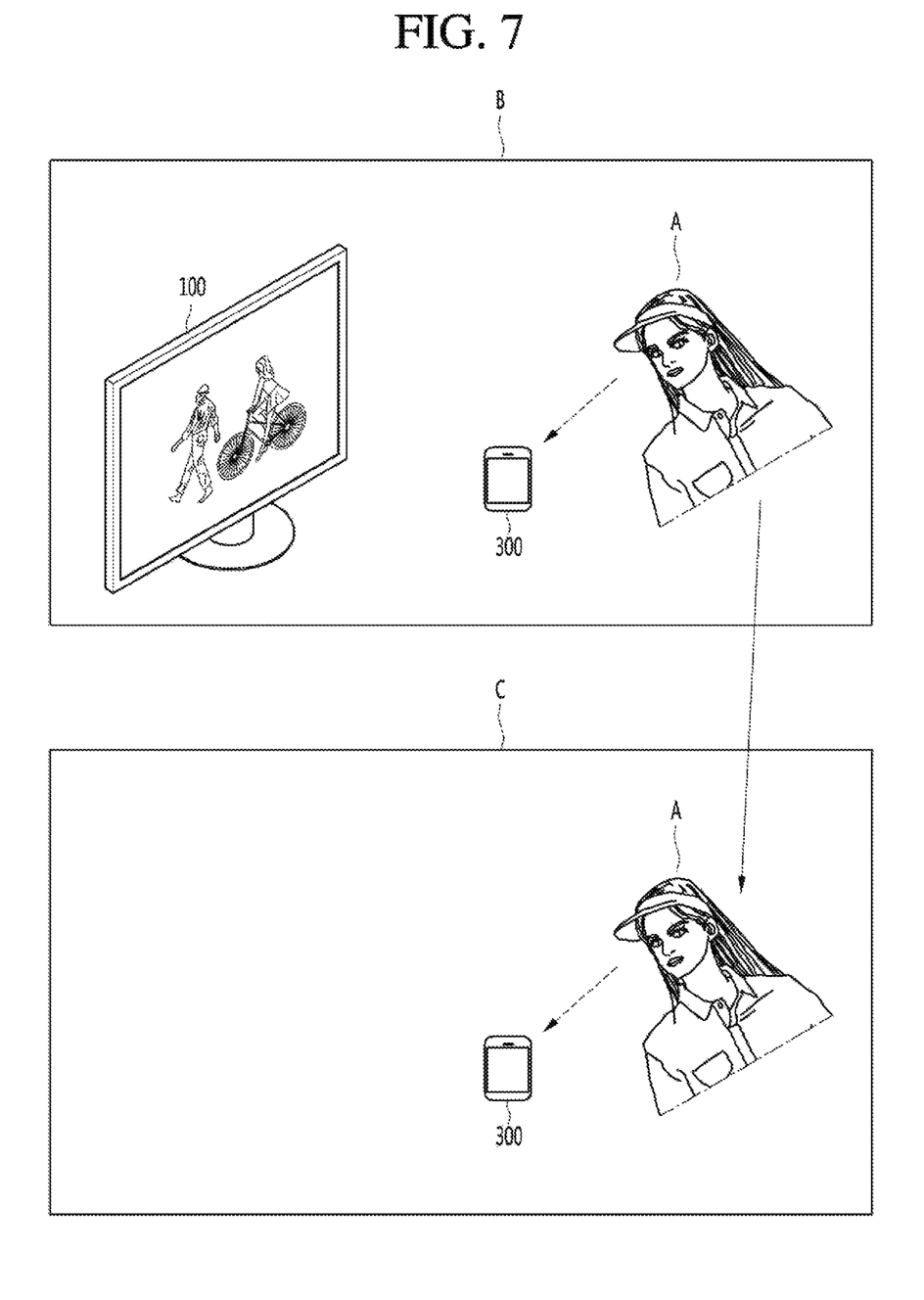

FIGS. 5 to 7 are views illustrating a method of obtaining a user's watching status according to an embodiment of the present invention.

At first, FIG. 5 shows an example where the control unit 170 of the display device 100 determines that the user is in a visual watching status.

Referring to FIG. 5, the display device 100 may identify that a user A is visually watching a broadcast program of the display device 100 using the face recognition and eye tracking technologies described above, and determine that the user A is in the visual watching status.

Next, referring to FIG. 6, the display device 100 may identify that the user A is watching the broadcast program of the display device 100 not visually but audibly using the face recognition and eye tracking technologies, and determine that the user is in the non-visual watching status. That is, the user A is not watching the image of the broadcast program that is played back by the display device 100 but is listening to the sound of the broadcast program only, and is watching the mobile terminal 300. In this case, the display device 100 may determine that the user is in the non-visual watching status.

Next, FIG. 7 is an example where if the user A is in a position where the user cannot visually watch the broadcast program played in the display device 100, the display device 100 determines that the user is in the non-visual watching status.

Referring to FIG. 7, if the user A watches the broadcast program being played back in the display device 100 in a main room B and then moves to a small room C, the display device 100 may receive the face recognition and eye tracking technologies described above and the moving status of the mobile terminal 300 from the mobile terminal 300 to determine that the user is in the non-visual watching status.

A description for FIG. 4 will be given again.

If it is obtained that the user is in the visual watching status, the control unit 170 returns the process to step S101 to maintain the play back of the broadcast program.

On the contrary, if it is obtained that the user is not in the visual watching status, the control unit 170 identifies whether the sound of the broadcast program is being transmitted to the mobile terminal 300 connected to the display device 100 (S105), and the control unit 170 transmits information of the display device 100 to the mobile terminal 300 (S107) if it is obtained that the sound of the broadcast program is being transmitted to the mobile terminal 300 connected to the display device 100.

If the control unit 170 is transmitting the sound of the broadcast program being played back in the display unit 180 to the mobile terminal 300 of the user, the control unit 170 may transmit information of the display device 100 to the mobile terminal 300.

If the control unit 170 is transmitting the sound of the broadcast program being played back in the display unit 180 to the mobile terminal 300 of the user, the control unit 170 may transmit information of the display device 100 to the mobile terminal 300 while outputting the sound of the broadcast program.

The information of the display device 100 may include watching information and subtitle information of the program being broadcasted currently and event information generating in the display device 100. The subtitle information and event information generating in the display device 100 will be described below.

In an embodiment, the watching information of the broadcast program may include at least one of a remaining time of the broadcast program that is currently played back, an end time of the broadcast program that is currently played back, a title of the broadcast program that is currently played back, a rating of the broadcast program that is currently played back, and a commentary of the broadcast program that is currently played back.

In an embodiment, the control unit 170 may additionally transmit watching information of the broadcast program while transmitting the sound of the broadcast program to the mobile terminal 300. That is, if the user is not in the visual watching status but in non-visual watching status, the user may audibly listen to the watching information of the broadcast program while listening to the sound of the broadcast program that is currently played back in the display device 100 through the mobile terminal 300. As such, the user may audibly identify the watching information of the broadcast program even while he or she is not watching the broadcast program that is currently played, thereby enhancing understanding of the broadcast program.

In another embodiment, if the sound of the broadcast program is being transmitted to the mobile terminal 300 connected to the display device 100 and the user is in the non-visual watching status, the control unit 170 may turn off the power of the display unit 180 and transmit the image of the broadcast program that is currently played back to the mobile terminal 300. The user may audibly watch the sound of the broadcast program through the display device 100 while visually watching the image of the broadcast program through the mobile terminal 300. That is, the user may listen to the sound of the broadcast program through the display device 100 while watching the broadcast program through the mobile terminal 300. More description will be given with reference to FIG. 8.

Figure 8:
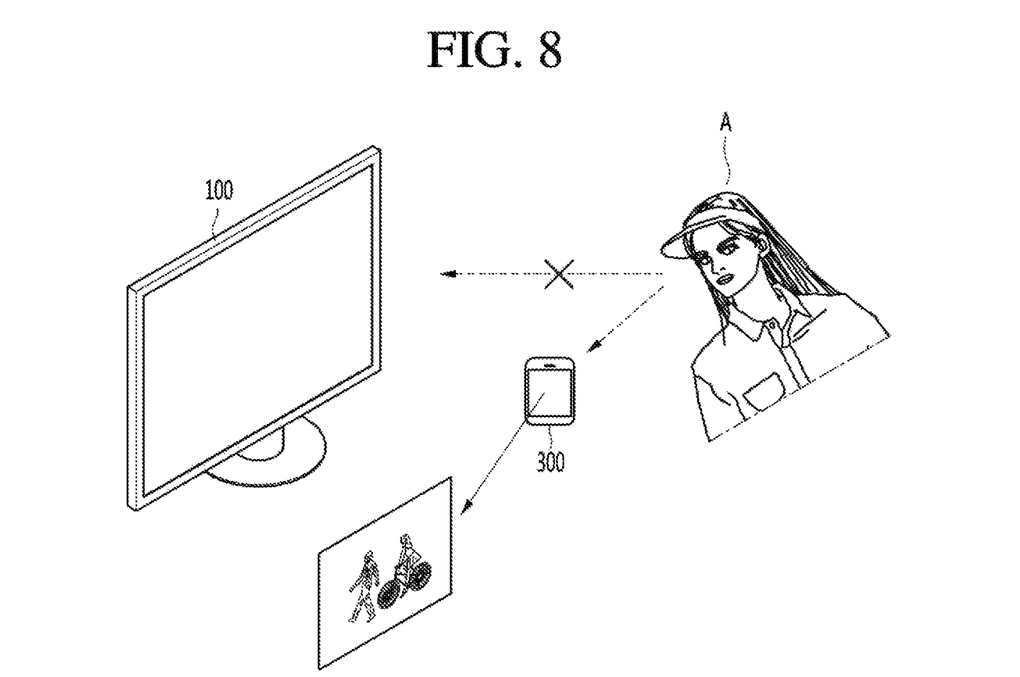
FIG. 8 is a view illustrating an operation of a display device depending on a user's watching status according to an embodiment of the present invention.

FIG. 8 is a view illustrating an operation of a display device depending on a user's watching status according to an embodiment of the present invention.

Referring to FIG. 8, if the user is in the non-visual watching status (if it is obtained that the user is not watching the display unit), the display device 100 may turn off the power of the display unit 180 so that the display device 100 does not display the image of the broadcast program but outputs the sound of the broadcast program. In this case, the user may listen to the sound of the broadcast program and watch the image of the broadcast program, so that he or she may easily watch the broadcast program.

A description will be given again with reference to FIG. 4.

Meanwhile, if the sound of the broadcast program is not transmitted to the mobile terminal 300 connected to the display device 100, the control unit 170 outputs the information of the display device as an audio (S109).

If the control unit 170 is not transmitting the sound of the broadcast program that is currently played back in the display unit 180 to the mobile terminal 300 of the user, it may output the information of the display device 100 through the audio output unit 185.

The control unit 170 may output the information of the display device 100 through the audio output unit 185 while outputting the sound of the broadcast program that is currently played back.

If the sound of the broadcast program is not being transmitted to the mobile terminal 300 connected to the display device 100 and the user is in the non-visual watching status, the control unit 170 may output the information of the display device 100 through the audio output unit 185 while not playing back the image of the broadcast program. That is, if the sound of the broadcast program is being transmitted to the mobile terminal 300 connected to the display device 100 and the user is in the non-visual watching status, the power of the display unit 180 is turned off so that the information of the display device 100 only may be audibly outputted. Those will be described with reference to FIG. 9.

Figure 9:
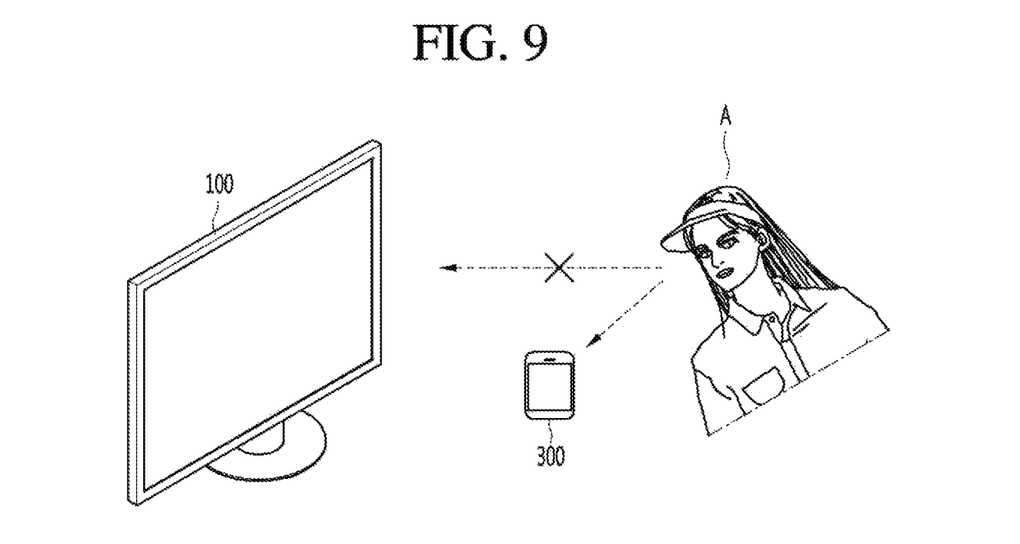
FIG. 9 is a view illustrating an operation of a display device depending on a user's watching status according to another embodiment of the present invention.

FIG. 9 is a view illustrating an operation of a display device depending on a user's watching status according to another embodiment of the present invention.

Referring to FIG. 9, if the user is in the non-visual watching status (if it is obtained that the user is not watching the display unit), the display device 100 may turn off the power of the display unit 180 so as not to display the image of the broadcast program and output the information of the display device 100 only. In this case, the non-visual watching status may include a situation that the user is not watching the mobile terminal 300.

In this case, the user may audibly listen to the information of the display device 100 so that it may be possible to utilize information easily and the display device 100 may turn off the power of the display unit 180, thereby preventing the power from being wasted.

Further, if the user is in the non-visual watching status, the display device 100 may control the volume of the sound outputted depending on the distance between the user and the display device 100. For example, if the user is in the non-visual watching status and if it is determined that the distance between the user and the display device 100 becomes great, the display device 100 may increase the volume of the output sound. Also, if it is determined that the distance between the user and the display device 100 becomes short, the volume of the output sound may be reduced. The display device 100 may further comprise a distance sensor (not illustrated) in order to measure the distance between the user and the display device 100. The display device 100 may measure the distance between the user and the display device 100 using any one of triangulation method and TOF (Time Of Flight) method that employ a distance sensor.

A description will be given again with reference to FIG. 4.

The information of the display device 100 may include watching information and subtitle information of the broadcast program that is currently played back and event information generating in the display device 100.

The watching information of the broadcast program may include at least one of a remaining time of the broadcast program that is currently played back, an end time of the broadcast program that is currently played back, a title of the broadcast program that is currently played, a rating of the broadcast program that is currently played back, and a commentary of the broadcast program that is currently played back.

Especially, if the user is basically in the non-visual watching status, like the blind, the display device 100 may identify that to audibly output the commentary of the broadcast program among the watching information of the broadcast program. For this, the tuner 131 of the display device 100 may receive the broadcast signal including the commentary of the broadcast program. That will be described with reference to FIGS. 10 and 11.

Figure 10:
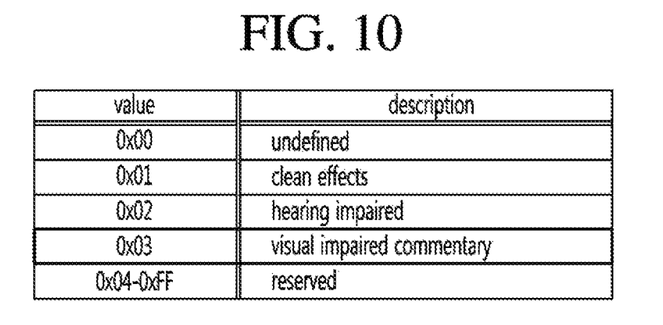
FIGS. 10 and 11 are views illustrating descriptors indicating commentaries of a broadcast program included in a broadcast signal according to an embodiment of the present invention.
Figure 11:
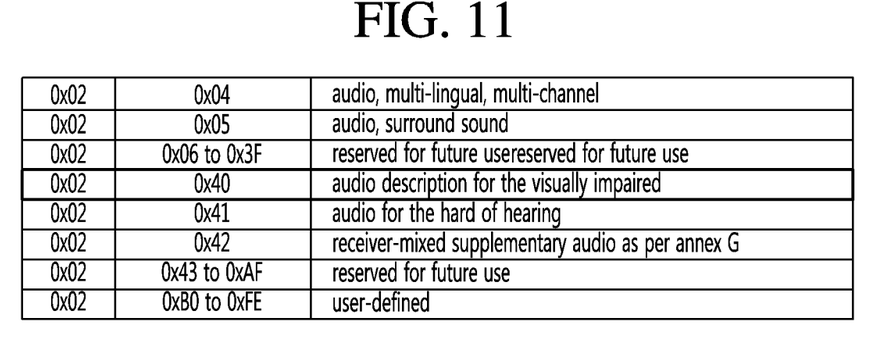

FIGS. 10 and 11 are views illustrating descriptors indicating commentaries of a broadcast program included in a broadcast signal according to an embodiment of the present invention.

FIG. 10 is a language descriptor of MPEG system IS13818 standard, and FIG. 11 is a component descriptor of DVB-SI standard.

Each descriptor may be included in the broadcast signal to be transmitted through the tuner 131.

Referring to FIG. 10, if an attribute value is 0x03, it indicates that a commentary of the broadcast program for the blind is included. Also, referring to FIG. 11, if attribute values are 0x02 and 0x40, it indicates that a sound description of the broadcast program for the blind is included.

If the user is in the non-visual watching status, the display device 100 may audibly output a commentary of the broadcast program based on the descriptor included in the received broadcast signal. Accordingly, there is an advantage that the blind user may understand broadcast program contents easily even though he or she is not able to visually watch the broadcast program.

A description will be given again with reference to FIG. 4.

The subtitle information may be subtitles related to the broadcast program that is currently played back. That is, if a foreign broadcast program is currently played back, the subtitle information may be a Korean-translated subtitle. Also, if the user is in the non-visual watching status, the display device 100 may convert the subtitle of the related broadcast program into a sound to output.

The subtitle information may be a subtitle that is not related to the broadcast program that is currently played back. That is, the subtitle information is a subtitle for advertisement or breaking news, which is not related to the broadcast program that is currently played back. Even in this case, if the user is in the non-visual watching status, the display device 100 may convert into a sound the subtitle that is not related to the relevant broadcast program to output.

The display device 100 may convert a subtitle into a sound to output, using Text-to-Speech conversion technology.

Event information generating in the display device 100 may include scheduled recording start notification information and channel switching notification information according to a scheduled watching. If the user is in the non-watching status, the display device 100 may convert the event information into a sound to output.

The more detailed description will be given with reference to FIG. 12.

Figure 12:
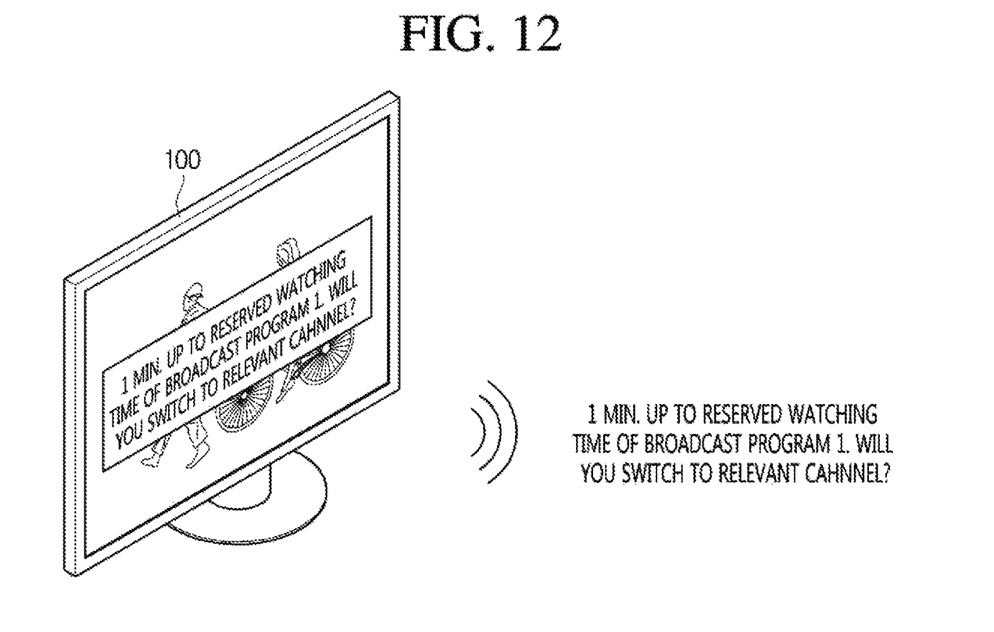
FIG. 12 shows an example to output event information of a display device audibly according to an embodiment of the present invention.

FIG. 12 shows an example to output event information of a display device audibly according to an embodiment of the present invention.

If the user is in the non-visual watching status, the display device 100 may display a notification <1 minute up to the scheduled watching time of the broadcast program 1. Will you switch to the relevant channel?> while playing back an image of the current broadcast program, and convert the notification into a sound to output.

According to an embodiment of the present invention, the above described method may be embodied as codes readable by a processor on a medium that has program recorded thereon. Examples of the medium readable by the processor may include ROM, RAM, CD-ROM, magnetic tape, floppy disc, optical data storage device, etc. and the medium may be embodied in a carrier wave (for example, a transmission on Internet).

The display device described above may not be restrictively applied to the examples and methods of the embodiments described above, and all or parts of the embodiments may be selectively combined so that the embodiments may be variously modified.

The invention claimed is:

1. A method for operating a display device, comprising:
playing an image of a broadcast program;
obtaining a user's watching status while the broadcast program is played;
providing information of the display device if the obtained user's watching status is obtained as a non-visual watching status in which the user does not watch a display unit of the display device, and
when the non-visual watching status is identified, transmitting the image of the broadcast program to the mobile terminal while turning off a power of a display unit of the display device and outputting a sound of the broadcast program.

2. The method of claim 1, wherein the providing of information comprises outputting the information of the display device as an audio through an audio output unit of the display device.

3. The method of claim 1, wherein the obtaining of the user's information comprises obtaining the user's watching status using at least one of a face recognition or an eye tracking.

4. The method of claim 1, wherein the information of the display device includes at least one of watching information, subtitle information of the broadcast program, or event information to be generated in the display device.

5. The method of claim 2, wherein the providing of information comprises outputting the information of the display device as the audio through an audio output unit of the display device while outputting a sound of the broadcast program.

6. The method of claim 4, wherein the watching information of the broadcast program comprises a commentary to describe contents of the broadcast program, and
wherein the providing of information comprises outputting the commentary to an audio track for the blind.

7. A display device, comprising:
a wireless communication unit configured to communicate with a mobile terminal;
a tuner configured to receive a broadcast signal;
a display unit configured to display an image of the broadcast program included in the broadcast signal;
an audio output unit configured to output a sound of the broadcast program; and
a control unit configured to provide information of the display device if a user's watching status is obtained as a non-visual watching status that a user does not watch the display unit of the display device,
wherein the control unit is further configured to transmit the image of the broadcast program to the mobile terminal while turning off a power of the display unit and continue to output the sound of the broadcast program when the non-visual watching status is identified.

8. The display device of claim 7, wherein the control unit controls the information of the display device to be audibly outputted through the audio output unit.

9. The display device of claim 7, wherein the information of the display device comprises any one of watching information and subtitle information of the broadcast program, and event information to be generated in the display device.

10. The display device of claim 8, wherein the control unit controls the information of the display device to be audibly outputted while outputting a sound of the broadcast program.

* * * * *